July 17, 1962   L. J. BACHLEDER ET AL   3,044,608
SHOCK ABSORBING SHIPPING CONTAINER
Filed Sept. 27, 1960
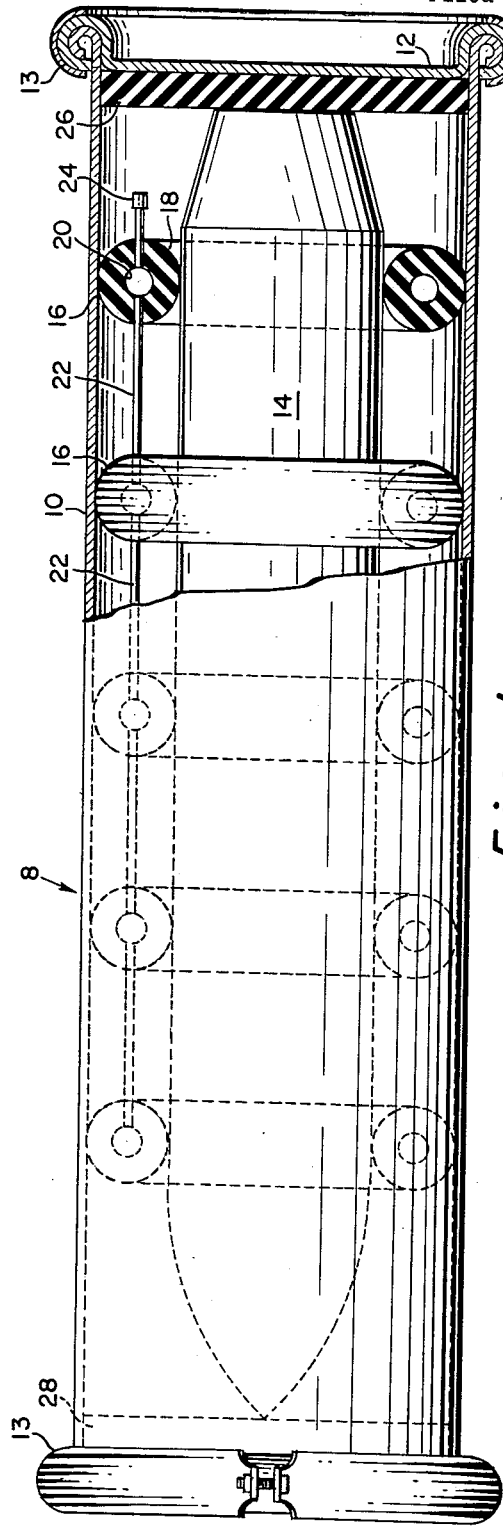
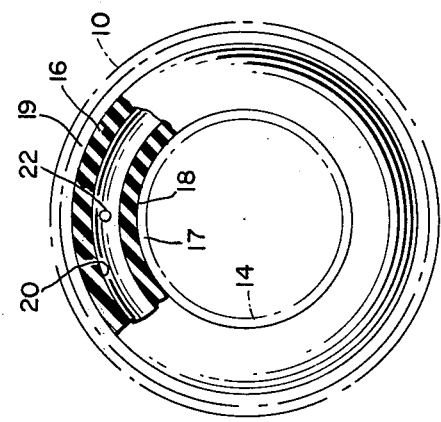
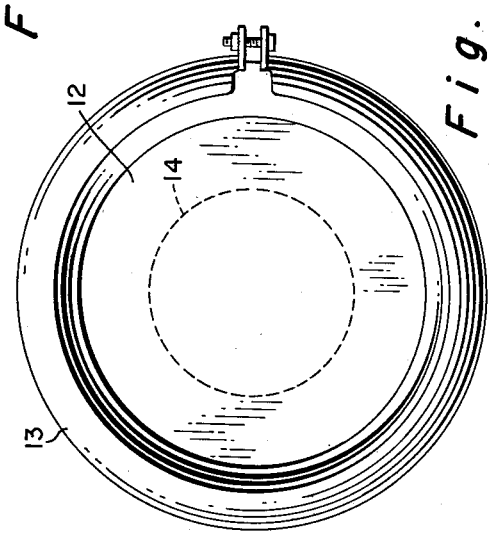
INVENTORS
GEORGE J. BRAZEAL
BY LOUIS J. BACHLEDER
*George J. Ruben*
ATTORNEY

United States Patent Office 3,044,608
Patented July 17, 1962

3,044,608
SHOCK ABSORBING SHIPPING CONTAINER
Louis J. Bachleder, 931 Elm Court, Culver City, Calif., and George J. Brazeal, 11016 Westwood Blvd., Oxnard, Calif.
Filed Sept. 27, 1960, Ser. No. 58,860
3 Claims. (Cl. 206—46)
(Granted under Title 35, U.S. Code (1952), sec. 266)

The invention described herein may be manufactured and used by or for the Government of the United States of America for governmental purposes without the payment of any royalties thereon or therefor.

This invention relates to shipping containers and more particularly to a shipping container utilizing elastic-pneumatic shock absorbers for supporting a fragile article therein.

The transportation of delicate and costly instruments and equipment, such as guided missiles, presents a unique problem for the container must be capable of absorbing various types of external transporting and handling forces and at the same time be compact and capable of facilitating loading and unloading the missile.

For the most part, the prior art devices for transporting missiles or the like are large and cumbersome, employing heavy springs and/or saddle mechanisms. Thin-walled inflatable interconnected air chambers have been employed as shock absorbers with the obvious disadvantage that if the chambers were accidentally deflated or punctured there is an immediate loss of adequate protection for the missile from the various impact forces. In addition, difficulty was experienced in the assembly and removal of the missiles in these prior art devices.

The present invention solves these problems by creating a container utilizing combined elastic and pneumatic shock absorbers. This is accomplished by providing a plurality of spaced absorbers positionable in an outer rigid casing. Each absorber has a central core opening to receive and encircle the article to be supported, and in the case of a missile, the absorber may be configured as a toroid. Each absorber is constructed of elastic material and has a small centrally-positioned air passage extending thereabout. The cross-sectional area of the air passage is small compared to the cross-sectional diameter of the elastic material. The air passages in the absorbers are interconnected by an air hose and pressurized, after packaging, through a suitable valve.

A primary object of this invention is to provide an improved inflatable shipping container.

Another object is to provide such a container with inflatable absorbers capable of absorbing shock after accidental deflation.

A further object is to provide shock absorbers that will retain their configuration in a deflated condition to permit the article to be slidably positioned therethrough.

Still other objects are to provide shock absorbers capable of gripping both the article to be supported and the outer rigid container to resist relative movement therebetween; and to provide a container that is light-weight, simple and inexpensive.

Other objects and many of the attendant advantages of this invention will be readily appreciated as the same become better understood by reference to the following detailed description when considered in connection with the accompanying drawings wherein:

FIG. 1 is a side elevation of the novel container, partially in section, showing the several shock absorbers in an inflated condition through pneumatic interconnection between the shock absorbers;

FIG. 2 is an end view of the containers; and

FIG. 3 is a partial cross-section taken through one of said absorbers prior to inflation showing the spaced outer and inner surfaces of the missile and container, respectively.

Referring to the drawing wherein like reference numerals designate similar parts throughout the several views, there is shown in FIG. 1 a container 8 comprising a hollow rigid cylindrical casing 10 provided with one or more detachable end covers 12, of the full-friction type, secured by clamping rings 13. The casing supports therein a fragile article, such as a missile 14, by means of a plurality of elastic, inflatable absorbers 16. The number of longitudinally spaced absorbers 16 to be employed will vary depending on the length and type of article to be supported.

As each absorber 16 is identical in construction, the description of one will suffice for all. Where the article to be supported is cylindrical, the absorber has a body portion configured as a toroid circumscribing a bore opening 18. With the absorber in a deflated condition (FIG. 3), the inner diameter of bore 18 is slightly more than the diameter of missile 14 which is adapted to be positioned therethrough, and the outer diameter of the body portion is slightly less than the inner diameter of casing 10.

For example, in a container suitable for supporting a Sparrow type air-to-air missile having a diameter of 8 inches, the diameter of bore 18, with the absorber in a deflated condition, can be 8¼ inches and the diameter of the absorber body is 17½ inches compared to an inner casing diameter of 18 inches. In other words, a ⅛ inch clearance at 17 is provided in bore 18 completely around the missile, and a ¼ inch clearance at 19 is provided in the casing 10 completely around the absorber. The purpose of the clearances will be described later.

Each absorber body is provided with a corresponding configured central air passage 20, the air passages of adjacent absorbers being interconnected in a series arrangement by air hoses 22. Using flexible hoses will permit the absorbers to be stacked for storage or transportation. A suitable valve 24 located in one of the air hoses permits the simultaneous charging of all of the air passages with a suitable air pressure or the like from a low pressurized source, not shown. In the example of the deflated absorber heretofore described having a cross-sectional diameter of the toroidal body of 4⅝ inches, air passage 20 can be 1 inch in diameter and a suitable air pressure can be 3 to 5 p.s.i.

The absorber body is constructed of an elastic material, such as rubber, capable of slight expansion when inflated to grip the adjacent surfaces, as will be explained, and, yet, sufficiently firm to be noncollapsible so as to retain its cross-sectional configuration and act as a cushion to protect the missile from impact in the event of accidental deflation such as by puncturing or leakage.

The missile is packaged into the container by first insertion freely through the several toroidal absorbers 16, being permitted by clearance 17, the absorbers being longitudinally spaced on the missile in the desired positions. The absorbers are then initially inflated through air hoses 22, eliminating clearance 17 between missile and absorbers, to grip the missile skin sufficiently to prevent longitudinal displacement when the assembly is inserted into casing 10. The missile and the assembled absorbers readily slide into casing without dislocation of the absorbers because a portion of clearance 19 still exists between the absorbers and the inner casing wall. When the assembled missile and absorbers are properly oriented in the casing, elastic absorbers 16 are then further inflated to eliminate completely the clearance 19 between absorber and casing and tightly grip the latter to prevent longitudinal movement therebetween. The final inflation of the absorbers also simultaneously increases the gripping force between the absorbers and the missile. Elastic end bumpers 26 and 28 may be positioned adjacent casing covers 12 to protect the nose and tail of the missile from accidental metal-to-metal contact.

The present invention provides a container for transporting fragile elongate articles which utilizes elastic-pneumatic shock absorbers that facilitate packaging and ensure protection to the article from impact forces in the event of accidental deflation of the absorbers. In addition, the longevity of container is increased since damaging the outer casing by denting and the like does not adversely affect the positioning of the absorbers nor the removal of a transported article.

Obviously many modifications and variations of the present invention are possible in the light of the above teachings. It is therefore to be understood that the invention may be practiced otherwise than as specifically described.

We claim:

1. A container for transporting a fragile elongate article comprising a rigid outer casing having a longitudinal axis, a plurality of longitudinally spaced apart shock absorbers positioned in the casing each shock absorber having a bore opening for receiving said article and having an axis aligned with the longitudinal axis of the casing, said absorbers being of a size initially to fit loosely within the casing in alignment with the casing axis, each of said absorbers being made of an elastic material having a central air passage coextensive with said absorber, means for inflating the absorbers through said air passages, said absorbers capable of expanding radially inwardly and outwardly, the cross-sectional area of each air passage being a minor portion of the cross-sectional area of the respective absorber whereby each absorber retains its original configuration when deflated to cushion the article from shock to which the casing may be subjected.

2. The container of claim 1 wherein the air passages of adjacent absorbers are interconnected by a flexible hose.

3. The container of claim 1 wherein each shock absorber in a deflated condition provides a clearance between the article and the absorber which is less than the clearance between the absorber and the casing whereby the absorber can be initially inflated to grip the article and then slid into the casing.

References Cited in the file of this patent
UNITED STATES PATENTS

| | | |
|---|---|---|
| 1,107,339 | Milliron | Aug. 18, 1914 |
| 1,457,496 | Butler | June 5, 1923 |
| 2,363,249 | Hutchinson | Nov. 21, 1944 |
| 2,449,591 | Couse | Sept. 21, 1948 |
| 2,874,826 | Matthews et al. | Feb. 24, 1959 |
| 2,904,207 | Kerstner et al. | Sept. 15, 1959 |